United States Patent
Kotecha et al.

(10) Patent No.: US 10,185,577 B2
(45) Date of Patent: Jan. 22, 2019

(54) RUN-TIME ADAPTION OF EXTERNAL PROPERTIES CONTROLLING OPERATION OF APPLICATIONS

(71) Applicant: Oracle International Corporation, Redwood Shores, CA (US)

(72) Inventors: Yagnesh Dilipbhai Kotecha, Pune (IN); Sandeep Jain, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 6 days.

(21) Appl. No.: 14/564,064

(22) Filed: Dec. 8, 2014

(65) Prior Publication Data
US 2016/0162305 A1 Jun. 9, 2016

(51) Int. Cl.
G06F 9/44 (2018.01)
G06F 9/445 (2018.01)
G06F 17/30 (2006.01)

(52) U.S. Cl.
CPC .... *G06F 9/44505* (2013.01); *G06F 17/30557* (2013.01)

(58) Field of Classification Search
None
See application file for complete search history.

(56) References Cited

U.S. PATENT DOCUMENTS

| | | | |
|---|---|---|---|
| 5,977,964 A | 11/1999 | Williams et al. | |
| 6,621,827 B1 * | 9/2003 | Rezvani | H04L 29/06 370/346 |
| 7,145,871 B2 | 12/2006 | Levy et al. | |
| 7,225,249 B1 * | 5/2007 | Barry | G06F 17/3089 709/227 |
| 7,705,721 B1 * | 4/2010 | Chen | G06F 11/30 714/47.1 |
| 8,473,325 B2 | 6/2013 | Barnhill, Jr. et al. | |
| 8,656,350 B2 | 2/2014 | Bates et al. | |
| 9,027,077 B1 * | 5/2015 | Bharali | H04L 63/02 726/1 |

(Continued)

OTHER PUBLICATIONS

Ashish. "How to Auto Switch Android Profiles Based on Time, Events and More." Guiding Tech. N.p., Aug. 22, 2012. Web. Mar. 10, 2016. <http://www.guidingtech.com/14061/auto-switch-android-profiles-time-event-based/>.*

(Continued)

*Primary Examiner* — Wei Y Zhen
*Assistant Examiner* — Binh K Luu
(74) *Attorney, Agent, or Firm* — Iphorizons PLLC; Narendra Reddy Thappeta

(57) ABSTRACT

An aspect of the present disclosure provides run-time adaption of external properties controlling operation of applications. In one embodiment, a setup data is maintained indicating conditions and properties that control the operation of applications. Each property is associated with a corresponding condition in the setup data to indicate that the property is to be configured upon satisfaction of the corresponding condition. In response to determining that a specific condition indicated in the setup data has been satisfied, a set of properties that is associated with the determined condition is identified. The applications are then automatically configured to thereafter operate with the identified set of properties.

17 Claims, 7 Drawing Sheets

(56) References Cited

U.S. PATENT DOCUMENTS

| | | | |
|---|---|---|---|
| 2003/0043846 A1* | 3/2003 | Purpura | H04L 12/2602 |
| | | | 370/468 |
| 2003/0191795 A1* | 10/2003 | Bernardin | G06F 9/505 |
| | | | 718/105 |
| 2009/0106546 A1 | 4/2009 | Weichel et al. | |
| 2015/0081906 A1* | 3/2015 | Backholm | H04W 74/06 |
| | | | 709/225 |
| 2016/0275158 A1* | 9/2016 | Baset | G06F 17/30572 |

OTHER PUBLICATIONS

IBM. "Automatic time-based configuration." IBM Knowledge Center. N.p., Feb. 1, 2001. Web. Mar. 10, 2016. <https://www.ibm.com/support/knowledgecenter/SSETD4_9.1.3/lsf_admin/time_configuration_auto_lsf.dita>.*

Bizhub. "Switching to Power Save Mode at Specified Time." Konicaminolta. N.p., Jul. 21, 2013. Web. Mar. 10, 2016. <https://web.archive.org/web/20130721060608/http://manuals.konicaminolta.eu/bizhub-C554-C454-C364-C284-C224/EN/contents/id08-0486.html>.*

Microsoft. "Event Monitors." Microsoft TechNet. N.p., Apr. 15, 2013. Web. Mar. 12, 2016. <https://technet.microsoft.com/en-us/library/ff629447.aspx>.*

Shields, Greg. "Configuration profiles: An iPad administrator's best friend." Tech Target, Oct. 2011, searchmobilecomputing.techtarget.com/tip/Configuration-profiles-An-iPad-administrators-best-friend. Accessed Sep. 6, 2016.*

Configuring System Properties, https://confluence.atlassian.com/display/DOC/Configuring+System+Properties, downloaded circa Jun. 25, 2014, pp. 1-12.

SAP HANA Administration Guide, SAP HANA Platform SPS 08, Document Version: 1.0, date May 28, 2014, pp. 49-51.

* cited by examiner

Browser – Configuration Framework http://www.acme.com/config/newrule.jsp ← 305

Rule Definition  310

| | |
|---|---|
| Rule Name | Rule001 |
| Description | Time based rule created for HR application |
| Application | HR Application ▼ |
| Property Name | Message Polling Interval ▼ |

Current/Default Value: 10

Time Based | Event Based | Pattern Based ← 320

330

| Start Time: 10:00:00 AM | End Time: 01:30:00 PM | Value: 20 |
| Start Time: 01:30:00 PM | End Time: 05:45:00 PM | Value: 30 |
| Start Time: 05:45:00 PM | End Time: 11:30:00 PM | Value: 5 |
| ... | ... | ... |
| Start Time: 01:00:00 AM | End Time: 10:00:00 AM | Value: 10 |

Duration: 30 days ▼  ～335

340 ～ [Save] [Close]

FIG. 3A

Browser – Configuration Framework http://www.acme.com/config/newrule.jsp ← 305

Rule Definition ← 310

Rule Name: [Rule001]

Description: [Time based rule created for HR application]

Application: [HR Application ▶]

Property Name: [Message Polling Interval ▶]  Current/Default Value [10]

| Time Based | Event Based | Pattern Based | ← 320

Message: [Application Idle ▶]  Occurrence: [5]  Value: [10]

374 ☑  Start Time: [05:45:00 PM]  End Time: [11:30:00 PM]

376 ☐  Event: [On Startup ▶]

370

340 ⟶ (Save) (Close)

FIG. 3C

RUN-TIME ADAPTION OF EXTERNAL PROPERTIES CONTROLLING OPERATION OF APPLICATIONS

BACKGROUND

Technical Field

The present disclosure relates to application servers, and more specifically to run-time adaption of external properties controlling operation of applications.

Related Art

Applications are software programs which can be executed to provide a corresponding utility. The utility may be provided to end users or other applications. Applications are commonly developed to operate based on various properties. The properties affect or control the behavior of the application in terms of aspects such as throughput performance, security, availability, etc.

Many of the properties are external in that their values are set outside of the software program, and the software program reads and operates based on such values. In contrast, there are several other properties which are controlled (e.g., by hard-coding) within the software programs. By using such external properties, the same software program can be easily configured to values suited in different environments at respective times of deployment.

However, the configured values may not be suitable during different run-time scenarios after an application is deployed. Aspects of the present disclosure provide for run-time adaption of external properties controlling operation of applications.

BRIEF DESCRIPTION OF THE DRAWINGS

Example embodiments of the present disclosure are described with reference to the accompanying drawings briefly described below.

FIGS. 3A-3C illustrates the manner in which a user/administrator specifies a setup data to be used for run-time adaption of external properties at run-time in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present disclosure provides run-time adaption of external properties controlling operation of applications. In one embodiment, setup data is maintained indicating conditions and properties that control the operation of applications. Each property is associated with a corresponding condition in the setup data to indicate that the property is to be configured upon satisfaction of the corresponding condition. In response to determining that a specific condition indicated in the setup data has been satisfied, a set of properties that is associated with the determined condition is identified. The applications are then configured automatically (without any manual intervention) to thereafter operate with the identified set of properties.

According to another aspect of the present disclosure, the setup data contains rules that specify the conditions and corresponding values to be set for the properties. For example, the setup data may contain a first rule specifying a first condition and a first value for a first property controlling the operation of a first application. Accordingly, in response to determining that the first condition is satisfied, the first property is set to the first value to cause the first application to thereafter be operative with the first property set to the first value.

When the first condition specifies a time instance, a current time is compared with the specified time instance to obtain a logical result. The above noted actions of identifying and configuring are performed on one value (e.g., True) of the logical result and not performed upon another value (e.g. False) of the logical result. When the first condition specifies an event, the first condition is determined to be satisfied upon the occurrence of the specified event.

When the first condition specifies (a pattern consisting of) a message received from a first application and a corresponding number of occurrences, a count of the number of times the specified message is received from the first application is maintained. The count is compared to the specified number of occurrences to obtain a logical result, with the above noted actions of identifying and configuring being performed on one value (e.g., True) of the logical result and not performed upon another value (e.g. False) of the logical result.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
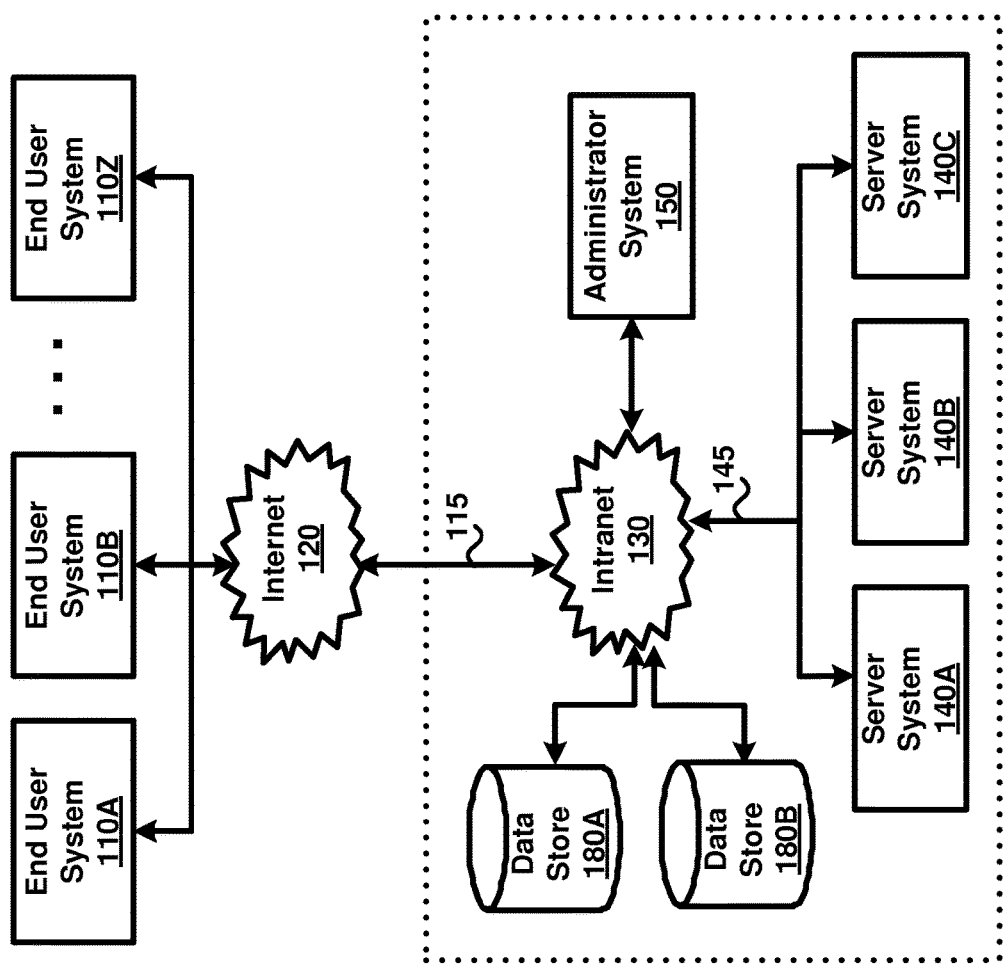
FIG. 1 is a block diagram illustrating an example environment in which several aspects of the present disclosure can be implemented.

FIG. 1 is a block diagram illustrating an example environment (computing system) in which several aspects of the present disclosure can be implemented. The block diagram is shown containing end user systems 110A-110Z, Internet 120, intranet 130, server systems 140A-140C, administrator system 150, and data stores 180A-180B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 130 represents a network providing connectivity between server systems 140A-140C, administrator system 150 and data stores 180A-180B all provided within an enterprise (shown with dotted boundaries). Internet 120 extends the connectivity of these (and other systems of the enterprise) with external systems such as end user systems 110A-110Z. Each of intranet 140 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

An IP packet is said to be directed to a destination system when the destination IP address of the packet is set to the IP address of the destination system, such that the packet is eventually delivered to the destination system by networks 120 and 130. When the packet contains content such as port numbers, which specifies the destination application, the packet may be said to be directed to such application as well. The destination system may be required to keep the corresponding port numbers available/open, and process the packets with the corresponding destination ports. Each of Internet 120 and intranet 130 may be implemented using any combination of wire-based or wireless mediums.

Each of data stores 180A-180B represents a non-volatile (persistent) storage facilitating storage and retrieval of a collection of data by applications (such as enterprise applications, management frameworks, etc.) executing in other systems of the enterprise such as server systems 140A-140C and administrator system 150. Some of the data stores 180A-180B may be implemented as a database server using relational database technologies and accordingly provide storage and retrieval of data using structured queries such as SQL (Structured Query Language). Alternatively, the data stores may be implemented as a file server providing storage and retrieval of data in the form of files organized as one or more directories, as is well known in the relevant arts.

Each of end user systems 110A-110Z represents a system such as a personal computer, workstation, mobile station, mobile phones, computing tablets, etc., used by users to generate and send user requests directed to specific systems/applications of the enterprise. The user requests may be generated using appropriate user interfaces (e.g., web pages provided by applications executing in the enterprise, a native user interface provided by a portion of the application downloaded from a server system, etc.). In general, an end user system requests an application for performing desired tasks and receives corresponding responses containing the results of performance of the requested tasks.

Each of server systems 140A-140C represents a server, such as a web/application server, executing enterprise applications capable of performing tasks requested by users using end user systems 110A-110Z. In response to receiving requests from end user systems, each enterprise application performs the tasks specified in the requests and sends the result of performance of the tasks to the requesting end user system. An enterprise application may use data stored internally (for example, in a non-volatile storage/hard disk within the server), external data (e.g., maintained in data stores 180A-180B) and/or data received from external sources (e.g., from the user) in performing such tasks.

It may be appreciated that some of the enterprise applications may be designed to operate based on external properties. Administrator system 150, provided according to several aspects of the present disclosure, facilitates run-time adaption of such external properties, as described below with examples.

3. Run-Time Adaption of External Properties

Figure 2:
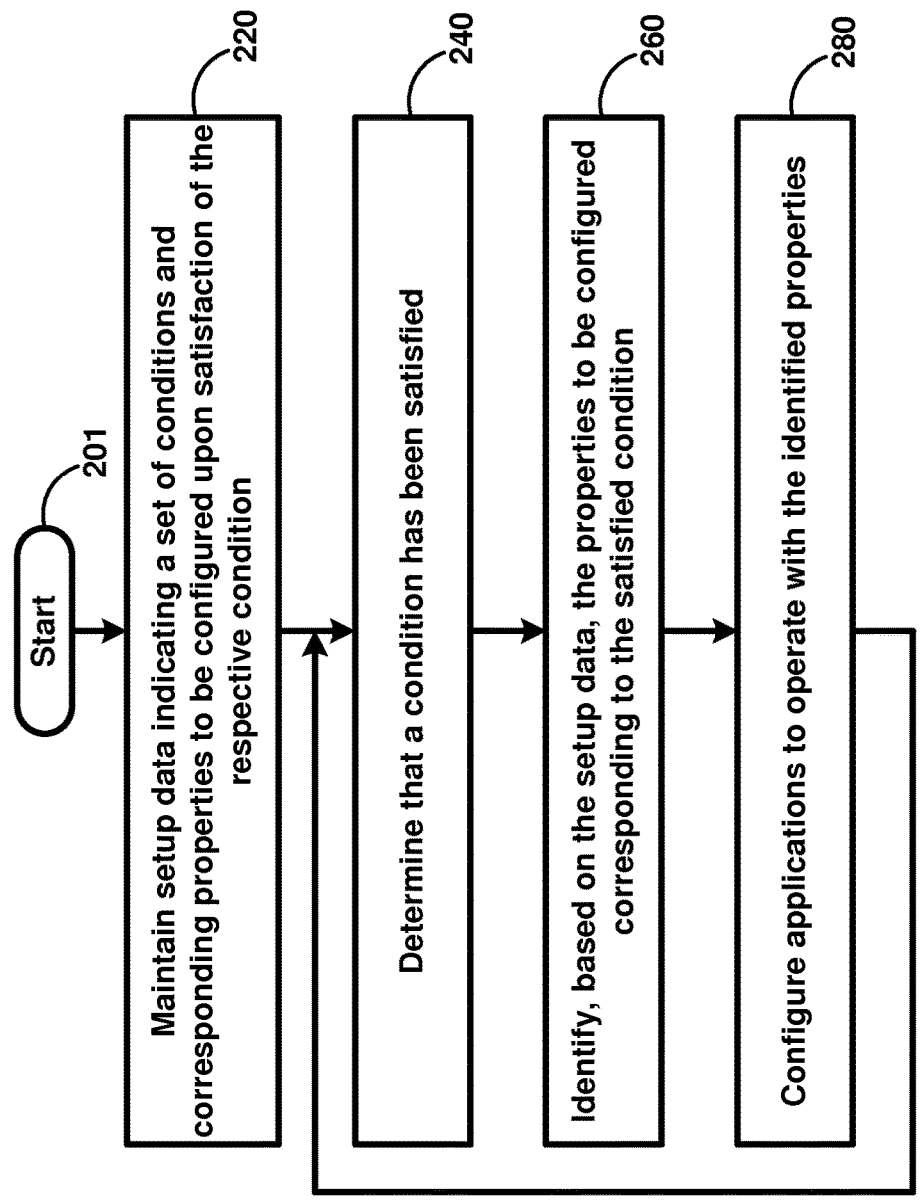
FIG. 2 is a flow chart illustrating the manner in which external properties controlling operation of applications are adapted at run-time according to an aspect of the present disclosure.

FIG. 2 is a flow chart illustrating the manner in which external properties controlling operation of applications are adapted at run-time according to an aspect of the present disclosure. The flowchart is described with respect to FIG. 1, in particular, administrator system 150 merely for illustration. However, many of the features can be implemented in other environments (and using potentially other types of systems/servers) also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts by reading the present disclosure. Many of such implementations are contemplated to be covered by several aspects of the present disclosure. The flow chart begins in step 201, in which control immediately passes to step 220.

In step 220, administrator system 150 maintains setup data indicating a set of conditions and corresponding (external) properties to be configured upon satisfaction of the respective condition (including combination of conditions). Each condition captures a corresponding scenario that can occur during run-time of the application. The properties may be specific to an application or may be of the environment (application server, operating system, etc.) in which applications are being executed.

The setup data may specify various values to which the properties are to be set upon satisfaction of the corresponding condition, which implies that the properties are set to corresponding values as suited for the scenario captured by the corresponding condition. In some embodiments, the number of properties that are to be configured may be different (with fewer or more properties) for different conditions. The setup data may be maintained in one of data stores 180A-180B.

In step 240, administrator system 150 determines that a condition has been satisfied. The determination may be performed in a known way as suitable to the environment of the enterprise. For example, when a condition specifies a time instance, a current time is compared with the specified time instance to obtain a logical result. The below noted steps of 260 and 280 are performed on one value (e.g., True) of the logical result and not performed upon another value (e.g. False) of the logical result.

In step 260, administrator system 150 identifies, based on the setup data maintained in step 220, the properties to be configured corresponding to the satisfied condition. Administrator system 150 may retrieve the setup data (or portions thereof) from one of data stores 180A-180B, and examine the retrieved data, for performing the identification.

In step 280, administrator system 150 configures applications to operate with the identified properties. Configuring entails setting the (existing) properties to the values specified in the setup data. It may be appreciated that the configuring of specific properties of an application may affect only the operation of the application, while configuring the properties of an environment may affect the operation of multiple applications executing the environment. Control then passes to step 240 for the satisfaction of a next condition.

It may be appreciated that steps 240-280 may be performed several times during the run-time operation of the applications, and accordingly dynamically modify the values of properties as would be suitable to the corresponding run-time scenario. In other words, the properties of the application are adapted during run-time.

The manner in which administrator system 150 may perform the run-time adaption of external properties according to FIG. 2 is illustrated below with examples.

4. User Interfaces

Figure 3B:
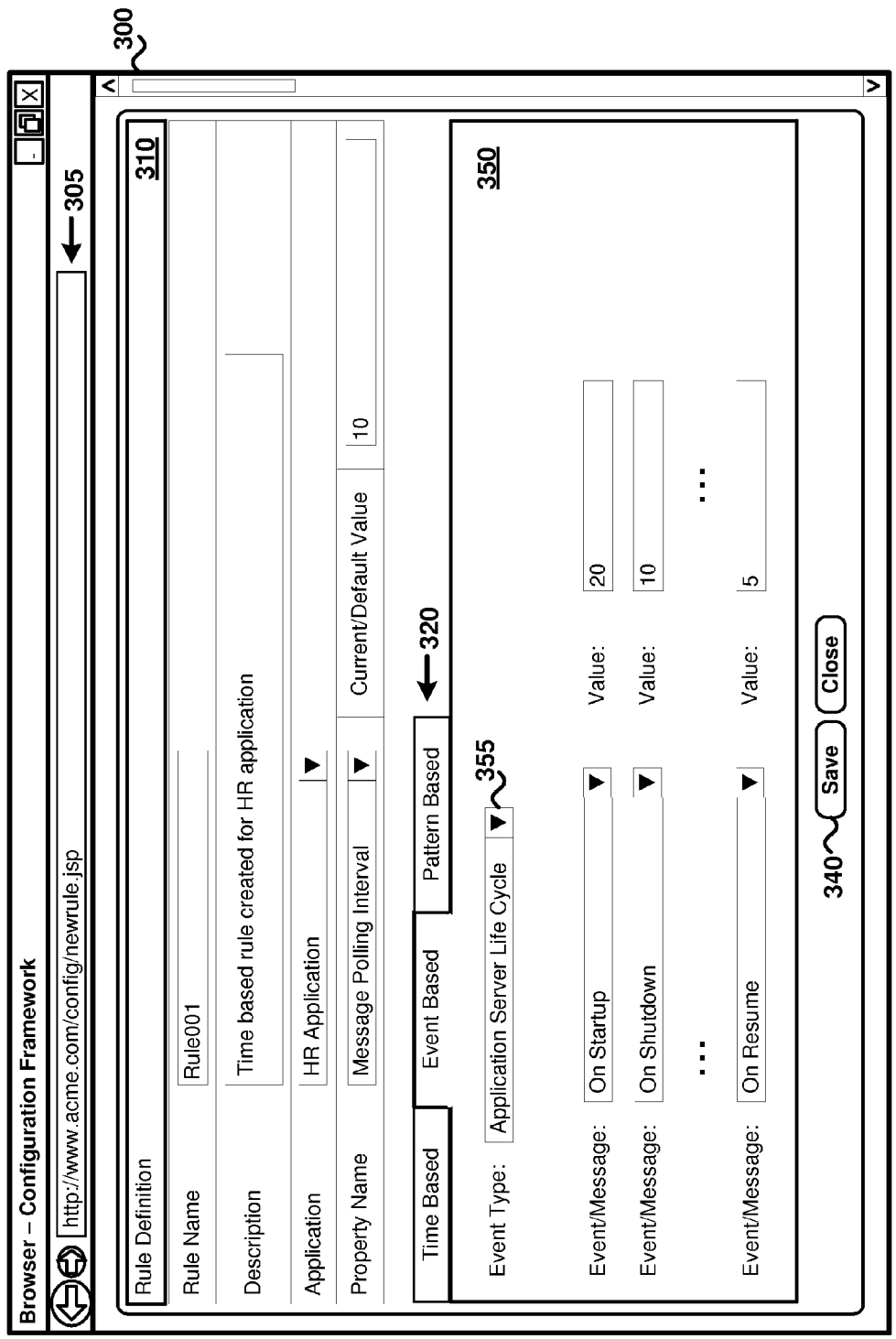

FIGS. 3A-3C illustrates the manner in which a user/administrator specifies a setup data to be used for run-time adaption of external properties at run-time in one embodiment. Broadly, a user specifies various rules as part of the setup data, with each rule specifying a property of an application, corresponding conditions, and value(s) to which the property is to be configured on satisfaction of the corresponding condition. FIGS. 3A-3C facilitates user to respectively specify time based, event based and pattern based rules. Common portions of the user interface are first described below followed by specific portions in each of the Figures.

Display area 300 (of FIGS. 3A-3C) depicts a portion of a user interface provided on a display unit (not shown in FIG. 1) associated with one of end user systems 110A-110Z (assumed to be 110A for illustration). In one embodiment, display area 300 corresponds to a browser displaying respective web pages provided by administrator system 150. The web pages are provided in response to a business user sending appropriate requests (for example, by specifying corresponding URLs shown in display area 305) using the browser in end user system 110A.

Display area 310 facilitates a user to provide a name (such as "Rule001") a description of the rule, to select an application (using the "Application" drop down list) and to select a application specific property that is to be configured based on the rule (using the "Property Name" drop down list). Display area 310 indicates that the user has selected the application "HR Application" and the application specific property "Message Polling Interval".

The message polling interval (in minutes) indicates the period between two polling requests to a repository for retrieving the user requests received from end user systems 110A-110Z. It is assumed that the user requests are stored in a repository first and then thereafter retrieved for processing by applications executing in server systems 140A-140C. A current/default value ("10" indicating 10 minutes) of the selected property is also shown in display area 310. The current/default value represents the value to which the selected property is set when none of the conditions (specified in the rule) are determined to be satisfied by administrator system 150. The current/default value may be set during deployment of the application.

It should be noted that for convenience, application servers, operating systems, etc. that provide a shared environment for multiple applications are also considered as applications, and may accordingly be shown in the "Application" drop down list. Upon selection by the user, the properties related to the application server/operating system are provided in the "Property Name" drop down list, thereby facilitating the user to specify rules for such (environment related) properties as well.

Display area 320 shows three tabs named "Time Based", "Event Based" and "Pattern Based" indicating the various types of rules that can be specified using the interface of display area 300. In response to a user/administrator selecting a tab/type of rule, a corresponding user interface specific to the selected type (such as shown in display areas 330, 350 and 370) is displayed to the user. "Save" button 340 enables the user to save/store the specified rule in a non-volatile storage (such as data stores 180A-180B). The rules may thereafter be retrieved for identifying the specific values to be configured in response to administrator system 150 determining that a corresponding condition has been satisfied.

The manner in which a user/administrator is facilitated to specify time based rules for configuring properties is described below with examples.

5. Specifying Time Based Rules

Referring to FIG. 3A, display area 330 facilitates a user/administrator to specify time based rules. Display area 330 is displayed in response to user selecting the "Time Based" tab in display area 320. Broadly, in a time based rule, the user specifies various time boundaries (by indicating various durations) in a day at which the properties are to be (re-)configured.

Accordingly, display area 330 facilitates the user to specify various combinations of a start time, an end time and a corresponding value (in minutes) for the property (Message Polling Interval), with the start time and end time representing time boundaries at which the values of the property are to be changed/configured. Display area 335 indicates a duration (such as "30 days") for which the property is to be changed based on the rule. After the expiry of the duration, the rule may be marked as inactive, and the corresponding conditions not checked for satisfaction by administrator system 150.

It may be observed that the start times and end times in display area 330 are specified as to cover all of the 24 hours of a day, though in alternative embodiments only the values for a few desired hours may be specified by the rule. In such a scenario, administrator system 150 sets the property to the default value (here, 10 minutes) for the other hours not specified in the rule. The time boundaries are commonly chosen based on the usage of the application (that is, the number of user requests received/processed by the application).

For example, the time boundaries shown in display area 330 corresponds to identifying that the number of user requests received by the HR application is low during the day hours and is high during the night hours. Accordingly, the value of the Message Polling Interval is set to higher values (20 and 30 minutes to cause fewer polling requests to be sent) during the day hours 10 AM to 5:45 PM, and set to lower value (5 minutes to cause more polling requests to be sent) during the night hours 5:45 PM to 11:30 PM.

Thus, the properties of the HR Application are adapted at run-time as suited for different scenarios (high number of requests, low number of request, etc.). The manner in which a user/administrator is facilitated to specify event based rules for configuring properties is described below with examples.

6. Specifying Event Based Rules

Referring to FIG. 3B, display area 350 facilitates a user/administrator to specify event based rules. Display area 350 is displayed in response to user selecting the "Event Based" tab in display area 320. Broadly, in an event based rule, the user specifies various events in response to which the properties are to be (re-)configured. It should be noted that after the property is set to a value (in response to a first event occurring), the value persists until a second event (specified in the rule) is determined to have occurred and the property is set to a new value corresponding to the second event.

Drop down list 355 enables a user/administrator to select the type of the event that is sought to be specified as part of the rule. The type of the event may be one of "Application Server Life Cycle" (corresponding to events that occur in the life cycle of an application server executing the selected application) and "Application Specific" (corresponding to the messages/events exposed by the selected application). Display area 335 indicates that the user has selected "Application Server Life Cycle" to indicate that events that occur in the life cycle of an application server executing the HR Application are to be used as the basis for configuring the values of the Message Polling Interval property.

Display area 350 displays the various events/messages (such as "On Startup", "On Shutdown", "On Resume", etc.) corresponding to the event type selected ("Application Server Life Cycle") in drop down list 355. Display area 350 also enables the user/administrator to specify various values corresponding to each of the displayed events/messages. The specific values may be determined based on the desired operation of HR Application during the application server life cycle.

The manner in which a user/administrator is facilitated to specify pattern based rules for configuring properties is described below with examples.

7. Specifying Pattern Based Rules

Referring to FIG. 3C, display area 370 facilitates a user/administrator to specify pattern based rules. Display area 370 is displayed in response to user selecting the "Pattern Based" tab in display area 320. Broadly, in a pattern based rule, the user specifies a pattern (a recurring set of events/messages) of interest in response to which the properties are to be (re-)configured. Different patterns may be specified by the user, with administrator system 150 then monitoring the messages for the occurrence of a matching pattern. Some common patterns that may be specified are:

Type-1: Receive application specific message N number of times;

Type-2: Receive application specific message N number of times within a time boundary T;

Type-3: Receive application specific message N number of times immediately after an application server life cycle event E; and Type-4: Receive application specific message N number of times immediately after an application server life cycle event E within a time boundary T.

Display area 370 facilitates the user to specify a pattern and a corresponding value (in minutes) for the property (Message Polling Interval). In particular, display area 370 enables the user to specify one of the patterns (Type-1 to Type-4) noted above, and the corresponding value for the property. However, in alternative embodiments, the user interface may facilitate the user to specify one or more instances of the same pattern and/or different types/number of patterns as will be apparent to one skilled in the relevant arts by reading the disclosure herein.

Accordingly, display area 370 is shown enabling the user to select an application specific message/event, the number of times (N) the message should recur/repeat (here, 5 indicated in the "Occurrence" text field) and the corresponding value (10) to be set to the property "Message Polling Interval" when the pattern is determined to have occurred. It may be appreciated that such a pattern (without the selection of checkboxes 374 and 376) corresponds to a Type-1 pattern noted above.

A user may also select one or both of checkboxes 374 and 376 to specify other patterns. For example, the user may select only checkbox 374 and specify a start time and end time (each of which is a time boundary T) to specify a Type-2 pattern. The user may also select only checkbox 376 and select an event in the drop down list (event E) to specify a Type-3 pattern. The user may select both of checkboxes 374 and 376, and specify all of the start time, end time and an event type to specify a Type-4 pattern. Again as noted above, the specific pattern to be matched may be chosen based on the operation of the HR Application and the corresponding environment.

It may be appreciated that FIGS. 3A-3C enables a user to specify simple conditions based on which properties are to be configured. However, in alternative embodiment, more complex conditions may be specified using one or more of regular expressions, logical operators (such as AND, OR, NOT, etc.), arithmetic operators (such as BETWEEN, etc.), as will be apparent to one skilled in the relevant arts by reading the disclosure herein.

Thus, by specifying desired conditions (capturing the run-time scenarios of interest) and corresponding values for the properties, a user/administrator is enabled to adapt the external properties controlling operation of applications at run-time. It may be appreciated that once the setup data is specified by the administrator, the run-time adaptation of the external properties is performed by administrator system 150. Such an approach is in contrast to alternative approaches wherein the user/administrator is required to manually configure the properties in response to the occurrence of each run-time scenario.

Thus, after the rules (specified in the interfaces of FIGS. 3A-3C) are stored in a non-volatile storage (in response to the user selecting button 340), administrator system 150 determines whether any of the stored rule/conditions are satisfied. In response to determining that a condition is satisfied, administrator system 150 sets the property "Message Polling Interval" to the value identified corresponding to the satisfied condition. An example implementation of administrator system 150 is described below with examples.

8. Administrator System

Figure 4:
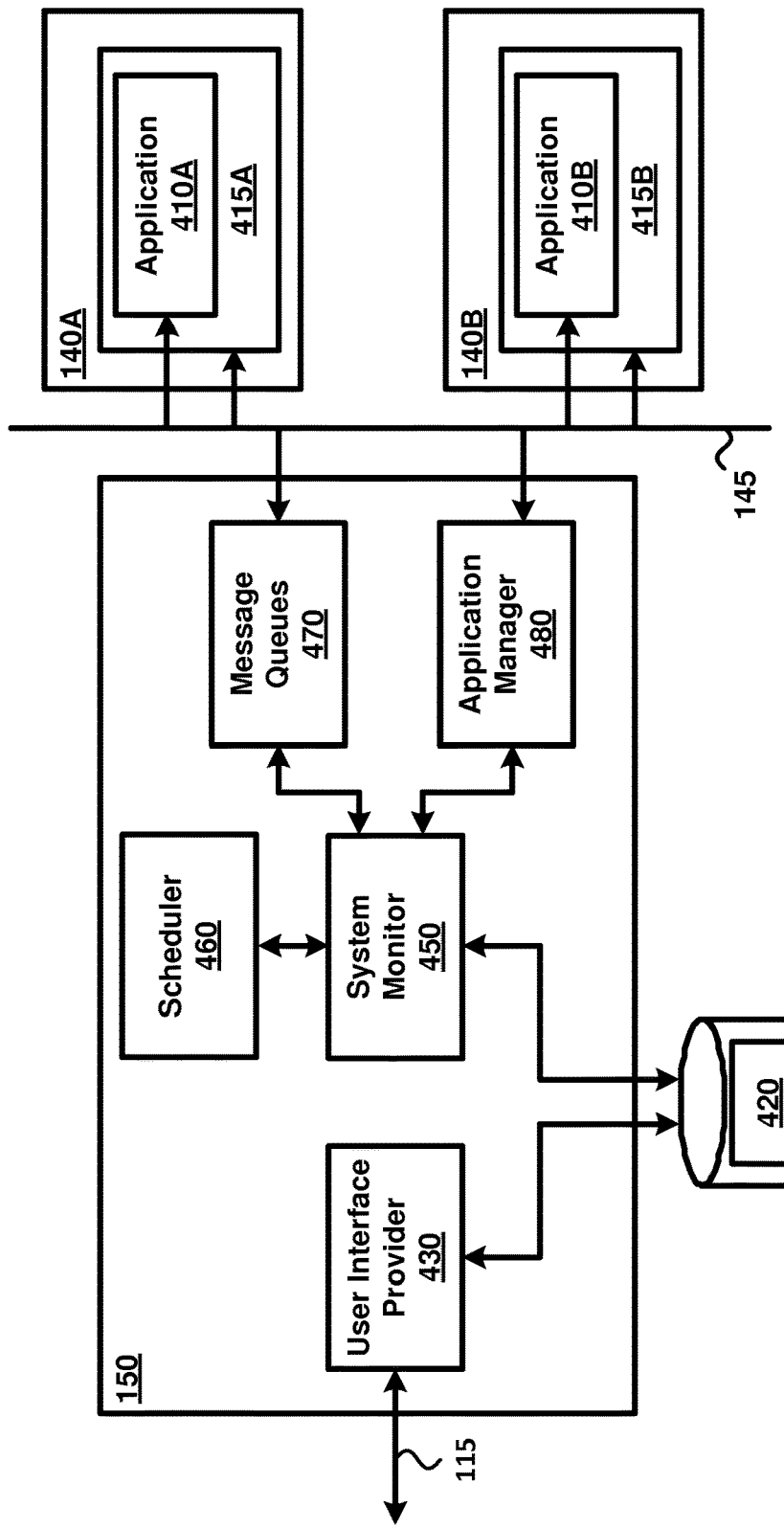
FIG. 4 depicts an example implementation of an administration system facilitating run-time adaption of external properties controlling operation of applications.

FIG. 4 depicts an example implementation of an administration system (150). The block diagram is shown containing applications 410A-410B, application servers 415A-415B, setup data 420, user interface (UI) provider 430, system monitor 450, scheduler 460, message queues 470 and application manager 480. In an embodiment, the various blocks are implemented according to Java/J2EE™ technologies, available from Oracle Corporation. Each of the blocks is described in detail below.

Applications 410A and 410B, executing respectively in server systems 140A and 140B represents enterprise applications that are implemented using J2EE (Java 2 Platform, Enterprise Edition) technologies. In the following description, it is assumed that application 410 corresponding to the HR application noted in FIGS. 3A-3C, and accordingly the manner in which the external property "Message Polling Interval" of application 410 is adapted at run-time is described in detail below.

It may be observed that the applications 410A and 410B are shown executing in the context of respective application servers 415A and 415B. As is well known, each application server provides a common development/run-time environment for executing multiple applications. Each application server may provide common services, such as interfacing with data stores 180A-180B, handling requests received from end user systems 110A-110Z, etc. as is well known in the relevant arts. An example application server is Oracle Weblogic Server™.

As noted above, each application server 415A-415B is considered to be an independent application similar to applications 410A-410B. Each of the applications (410A-410B and 415A-415B) is designed to provide various messages indicating the internal states of the application, while also having external properties that are configurable using external software programs (such as application manager 480). Though not shown, it should be noted that both of the applications and application servers may be executing on a JVM (Java Virtual Machine) provided in the respective server system.

Setup data 420 shown stored in data store 180A, specifies a set of rules based on which applications are to be configured. Data store 180A is assumed to be implemented as a database server using relational database technologies and accordingly setup data 420 is maintained in the form of one or more tables (containing corresponding columns) in a database in the database server. Setup data 420 may be stored and retrieved using queries according to SQL (Structured Query Language).

UI provider 430 receives (via path 115) requests from end user systems 110A-110Z for performance of various tasks (identified by corresponding URLs), and in response provides (via path 115) web pages to the requesting end user system. The web pages when displayed on the requesting end user system causes the appropriate user interfaces (such as shown in FIGS. 3A-3C) to be provided to the users/administrators. UI provider 430 may thereafter receive (for example, in response to the user clicking on button 340) the data corresponding the user specified rules and store (by sending appropriate SQL queries) the rules in setup data 420. UI provider 430 may also retrieve the rules from setup data 420 and provide them to the end user systems (in the web pages) to facilitate the users to modify the rules.

System monitor 450 may be implemented as a daemon process that continuously executes in the background and determines whether any of the conditions specified in setup data 420 is satisfied at each time instance. In one embodiment, system monitor 450 first monitors whether any new rule has been added to setup data 420. In response to a new rule being added, system monitor 450 determines the type (time based, event based, pattern based) of the new rule, and then processes the rule correspondingly. The manner in which system monitor 450 processes different types of rules is described below with examples.

9. Processing Time Based Rules

In response to a new time based rule being added, system monitor 450 determines the specific time instances/boundaries at which the properties are to be configured. System monitor 450 may then compares (e.g., checks for equality) a current time with the specified time instance(s) to obtain a logical result. System monitor 450 may then perform the actions of identifying of the properties/values and configuring if the logical result has one value (e.g., True) and not perform if the logical result has another value (e.g. False).

In one embodiment, system monitor 450 schedules jobs for the determined time instance(s)/boundaries with scheduler 460. For example, in response to the conditions specified in display area 330 for the property "Message Polling Interval", system monitor 450 may schedule various jobs at the different time boundaries (such as at 1:30 PM) every day, with each job indicating the corresponding value to which the property is to be set.

Scheduler 460 represents a third party library (such as Quartz Scheduler, an open-source software available from Terracotta Company) that facilitates the creation of simple or complex schedules for executing various jobs/tasks. Scheduler 460 accordingly receives various jobs and corresponding time instances from system monitor 450 and stores the received data in a data store (not shown). Upon the current time instance equaling any of the stored time instances (every day), scheduler 460 notifies (by raising an alarm) system monitor 450 of the specific job/task to be performed. In other words, scheduler 460 sends alarms at each time boundary (every day) to system monitor 450.

In response to receiving an alarm at a specific time boundary, system monitor 450 identifies the specific values of the properties to be configured corresponding to the received time boundary. For example, in response to an alarm at 1:30 PM, system monitor 450 determines that the property "Message Polling Interval" is to be set to the value 30 (based on the information in the job, or by retrieving the information from setup data 420). System monitor 450 accordingly interfaces with application manager 480 to set the properties (such as "Message Polling Interval") to the identified values (such as 30).

Application manager 480 represents a management tool that facilitates the configuration of external properties of various applications (such as applications 410A-410B and application servers 415A-415B). Application manager 480 may be implemented using JMX (Java Management Extensions), and accordingly enables the various configurable properties of the applications to be set and retrieved (from server systems 140A-140B).

Such configurability may be provided by MBeans (managed beans) that are (implemented and) exposed by the applications, as is well known in the arts. Application manager 480 may use such MBeans to set the value of the property "Message Polling Interval" to 30 (minutes) in response to receiving a request from system monitor 450 (when the current time equals 1:30 PM every day).

10. Processing Event Based Rules

System monitor 450 also processes event based rules. For example, in response to a new event based rule being added, system monitor 450 determines the specific events that are specified as part of the conditions in the new rule and then interfaces with message queues 470 to monitor the specific events. For example, in response to the conditions specified in display area 350 for the property "Message Polling Interval", system monitor 450 may monitor the life cycle events such as "On Startup", "On Shutdown", etc. of the application server 415A (executing HR application 410A).

Message queues 470 represent a point-to-point messaging system implemented using Java Message Service (JMS) which enables software programs to create, send, receive, and read messages. Message queues 470 consist of various queues, with each queue holding the messages of a corresponding type. Producers (such as applications 410A-410B and application servers 415A-415B) create and send (via path 145) messages of different types, with messages queues 470 receiving (via path 145) such messages and holding them in the corresponding queues (based on the types). Queues generally retain all messages stored in them until the messages are consumed or until the messages expire. Consumers (such as system monitor 450) may register themselves with specific queues, and may accordingly be notified of the arrival of new messages in the specific queues.

In one embodiment, message queues 470 contain a queue corresponding to (and accordingly holds the messages received from) each of the applications (410A-410B, 415A-415B). In response to the identifying the new event based rule, system monitor 450 registers (with message queues 470) as a consumer for the queue corresponding to application server 415A. In response to an event/message being received in the queue, message queues 470 notifies system monitor 450, which in turn checks whether the received event/message matches any of the events/messages specified in the rule.

Upon determining a match, for example when the event is "On Startup", system monitor 450 identifies the values of the properties and then interfaces with application manager 480 to set the properties (such as "Message Polling Interval") to the identified values (such as 20), as described above.

11. Processing Pattern Based Rules

System monitor 450 also processes pattern based rules similar to the processing of time based and event based rules. However, to identify patterns such as Type-1 pattern specified in the rules, system monitor 450 maintains additional data, such as counters that indicate the number of occurrence of various events/messages. The additional data may be maintained in a memory (not shown) internal to administrator system 150 or in data store 180A (for example, in additional tables different from the table storing the rules data).

For example, in response to receiving pattern based rule shown in display area 370 for the property "Message Polling Interval", system monitor 450 may first a job at the start and end time boundaries of 5:45 PM and 11:30 PM with scheduler 460. In response to receiving an alarm at the start time boundary 5:45 PM, system monitor 450 registers with message queues 470 as a consumer for the queue corresponding to the HR Application (410A), and also initializes a counter (assumed to be C1) for the "Application Idle" message (specified in the rule) to 0.

In response to receiving notifications from message queues 470 corresponding to different events/messages, system monitor 450 may determine whether they match any of the events/messages specified in the rule (such as "Application Idle"), and if such a match is determined increment a counter (C1) corresponding to the message.

System monitor 450 then compares (checks for equality) the counter (C1) to the number of occurrences (5) specified in the rule to obtain a logical result. In the scenario that the logical result has one value (e.g. True indicating that the counter is equal to the number of occurrences), system monitor 450 identifies the values of the properties and then interfaces with application manager 480 to set the properties (such as "Message Polling Interval") to the identified values (such as 10), as described above.

In the scenario that the logical result has another value (e.g. False indicating that the counter is not equal to the number of occurrences), system monitor 450 may continue to monitor for notifications from message queues 470. System monitor 450 may stop monitoring and reset the counters (C1) in response to receiving an alarm at the end time boundary 11:30 PM.

Thus, administrator system 150 facilitates the run-time adaption of properties based on a setup data (containing rules) specified by a user/administrator. It may be appreciated that after the setup data is received from the user/administrator, the operation of administrator system 150 to configure the properties to various values based on matching conditions is automatic (without any manual intervention). In other words, administrator system 150 configures the external properties of the applications, in response to determining matching conditions, based on the setup data without requiring manual intervention. Accordingly, the burden of the user/administrator in adapting the properties (controlling operation of applications) at run-time is simplified.

It should be further appreciated that the features described above can be implemented in various embodiments as a desired combination of one or more of hardware, executable modules, and firmware. The description is continued with respect to an embodiment in which various features are operative when the instructions in the executable modules are executed.

12. Digital Processing System

Figure 5:
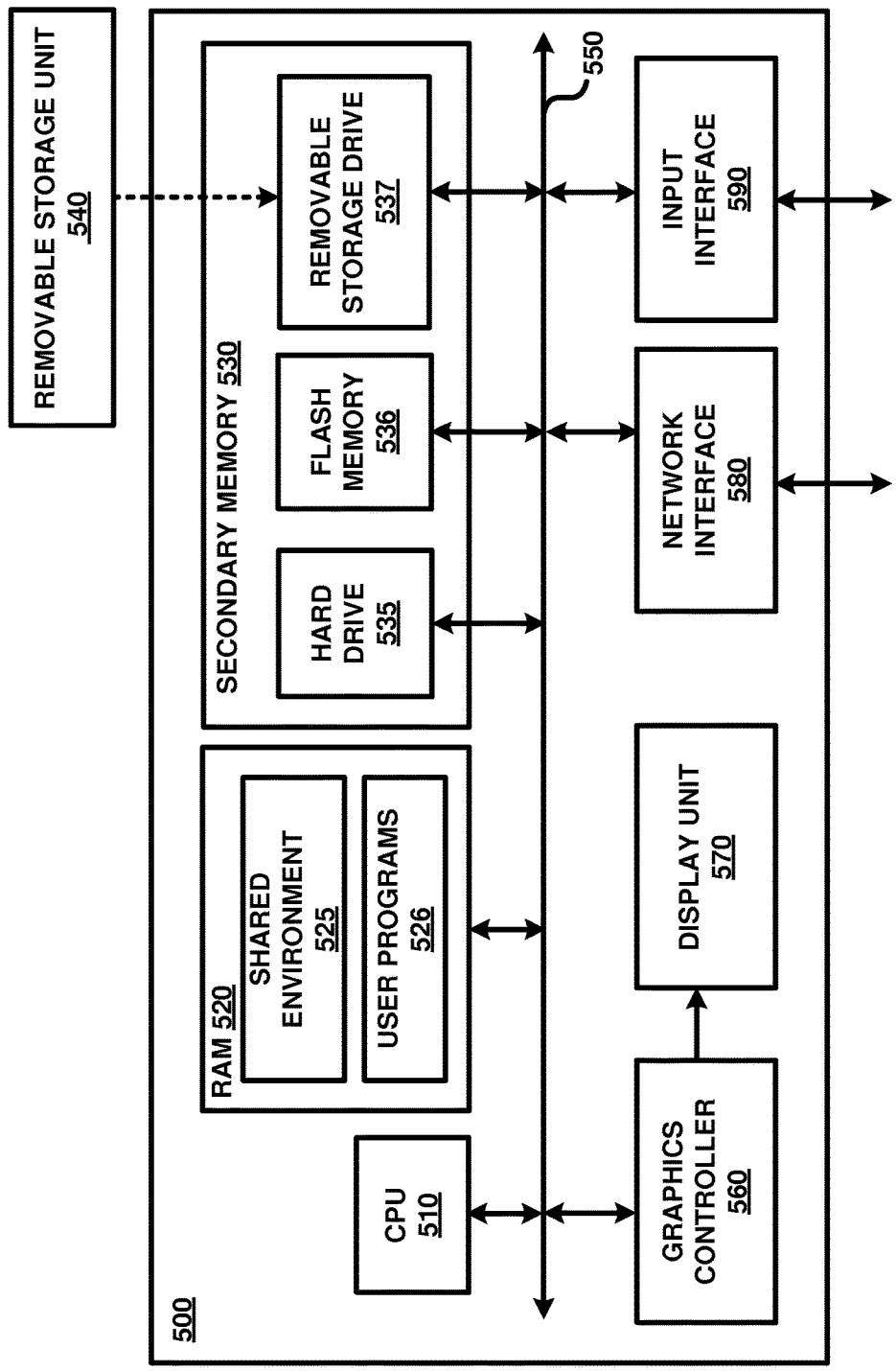
FIG. 5 is a block diagram illustrating the details of a digital processing system in which several aspects of the present disclosure are operative by execution of appropriate software instructions.

FIG. 5 is a block diagram illustrating the details of digital processing system 500 in which several aspects of the present disclosure are operative by execution of appropriate software instructions. Digital processing system 500 corresponds to administrator system 150 or other systems (e.g., end user systems 110A-110Z) from which various features described above can be provided.

Digital processing system 500 may contain one or more processors (such as a central processing unit (CPU) 510), random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550.

RAM 520 is shown currently containing software instructions constituting shared environment 525 and/or user programs 526 (such as enterprise applications, management framework, etc.). Shared environment 525 contains utilities shared by user programs, and such shared utilities include application servers, operating system, device drivers, virtual machines, flow engines, etc., which provide a (common) run time environment for execution of user programs 526.

Graphics controller 560 generates display signals (e.g., in RGB format) to display unit 570 based on data/instructions received from CPU 510. Display unit 570 contains a display screen to display the images defined by the display signals (such as the portions of the user interfaces of FIGS. 3A-3C). Input interface 590 may correspond to a keyboard and a pointing device (e.g., touch-pad, mouse) that may be used to provide various inputs (such as to specify the desired inputs, etc. in the user interfaces of FIGS. 3A-3C). Network interface 580 provides connectivity to a network (e.g., using Internet Protocol), and may be used to communicate with other connected systems (such as server systems 140A-140C, data stores 180A-180B).

Secondary memory 530 may contain hard drive 535, flash memory 536, and removable storage drive 537. Secondary memory 530 represents a non-transitory medium, which may store the data (for example, portions of setup data 410) and software instructions (for example, for performing the steps of FIG. 2), to enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Secondary memory 530 may contain hard drive 535, flash memory 536, and removable storage drive 537. Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

13. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of controlling operation of applications from an administrator system, said method comprising:
   maintaining a setup data indicating a plurality of conditions and a plurality of values for a polling interval,
   wherein said polling interval specifies a period between two polling requests from each of a set of applications to a repository, wherein said repository first stores user requests received from external system,
   wherein each application of said set of applications is in an operational state to thereafter send polling requests to retrieve respective user requests from said repository according to said polling interval, process the user requests to generate respective responses, and send the responses to the corresponding requesting external systems,
   wherein said setup data indicates a first condition and an associated first value for said polling interval;
   determining, by said administrator system when said set of applications are in said operational state, that said first condition of said plurality of conditions has been satisfied;
   identifying, by said administrator system based on said setup data, said first value for said polling interval associated with said first condition; and
   configuring automatically by said administrator system over said network, a first application of said set of applications to cause said first application to thereafter send successive polling requests with said period equaling said first value.

2. The method of claim 1, wherein said first condition specifies a first time instance, wherein said determining comprises comparing a current time with said first time instance to obtain a logical result, wherein said identifying and said configuring are performed on one value of said logical result and not performed upon another value of said logical result.

3. The method of claim 1, wherein said first condition specifies a first event, wherein said determining determines that said first condition is satisfied upon occurrence of said first event.

4. The method of claim 1, wherein said first condition specifies a first message and a number of occurrences, wherein said determining comprises:
 maintaining a count of the number of times said first message is received from said first application; and
 comparing said count with said number of occurrences to obtain a logical result,
 wherein said identifying and said configuring are performed on one value of said logical result and not performed upon another value of said logical result.

5. The method of claim 4, wherein said first condition further specifies a first time instance, wherein said maintaining and said comparing are performed only after said first time instance.

6. The method of claim 4, wherein said first condition further specifies a first event, wherein said maintaining and said comparing are performed only upon the occurrence of said first event.

7. The method of claim 1, wherein said polling interval controls the throughput performance of an enterprise application and also an application server in whose context said enterprise application is executed, said enterprise application and said application server being contained in said set of applications and executing on a server system of said set of server systems.

8. A non-transitory machine readable medium storing one or more sequences of instructions for enabling an administrator system to control operation of applications, wherein execution of said one or more instructions by one or more processors contained in said administrator system enables said administrator system to perform the actions of:
 maintaining a setup data indicating a plurality of conditions and a plurality of values for a polling interval,
 wherein said polling interval specifies a period between two polling requests from each of a set of applications to a repository, wherein said repository first stores user requests received from external system,
 wherein each application of said set of applications is in an operational state to thereafter send polling requests to retrieve respective user requests from said repository according to said polling interval, process the user requests to generate respective responses, and send the responses to the corresponding requesting external systems,
 wherein said setup data indicates a first condition and an associated first value for said polling interval;
 determining when said set of applications are in said operational state, that said first condition of said plurality of conditions has been satisfied;
 identifying, by said administrator system based on said setup data, said first value for said polling interval associated with said first condition; and
 configuring automatically by said administrator system over said network, a first application of said set of applications to cause said first application to thereafter send successive polling requests with said period equaling said first value.

9. The non-transitory machine readable medium of claim 8, wherein said first condition specifies a first time instance, wherein said determining comprises comparing a current time with said first time instance to obtain a logical result, wherein said identifying and said configuring are performed on one value of said logical result and not performed upon another value of said logical result.

10. The non-transitory machine readable medium of claim 8, wherein said first condition specifies a first event, wherein said determining determines that said first condition is satisfied upon occurrence of said first event.

11. The non-transitory machine readable medium of claim 8, wherein said first condition specifies a first message and a number of occurrences, wherein said determining comprises one or more instructions for:
 maintaining a count of the number of times said first message is received from said first application;
 comparing said count with said number of occurrences to obtain a logical result,
 wherein said identifying and said configuring are performed on one value of said logical result and not performed upon another value of said logical result.

12. The non-transitory machine readable medium of claim 11, wherein said first condition further specifies a first time instance and a first event, wherein said maintaining and said comparing are performed only after said first time instance and upon the occurrence of said first event.

13. A digital processing system comprising:
 a processor;
 a random access memory (RAM);
 a non-transitory machine readable medium to store one or more instructions, which when retrieved into said RAM and executed by said processor causes said digital processing system to perform the actions of:
  maintaining a setup data indicating a plurality of conditions and a plurality of values for a polling interval,
  wherein said polling interval specifies a period between two polling requests from each of a set of applications to a repository, wherein said repository first stores user requests received from external system,
  wherein each application of said set of applications is in an operational state to thereafter send polling requests to retrieve respective user requests from said repository according to said polling interval, process the user requests to generate respective responses, and send the responses to the corresponding requesting external systems,
  wherein said setup data indicates a first condition and an associated first value for said polling interval;
  determining, by said administrator system when said set of applications are in said operational state, that said first condition of said plurality of conditions has been satisfied;
  identifying, by said administrator system based on said setup data, said first value for said polling interval associated with said first condition; and
  configuring automatically by said administrator system over said network, a first application of said set of applications to cause said first application to thereafter send successive polling requests with said period equaling said first value.

14. The digital processing system of claim 13, wherein said first condition specifies a first time instance, wherein said digital processing system compares a current time with said first time instance to obtain a logical result, wherein said identifying and said configuring are performed on one value of said logical result and not performed upon another value of said logical result.

15. The digital processing system of claim 13, wherein said first condition specifies a first event, wherein said digital processing system determines that said first condition is satisfied upon occurrence of said first event.

16. The digital processing system of claim 13, wherein said first condition specifies a first message and a number of occurrences, wherein for said determining, said digital processing system performs the actions of:
  maintaining a count of the number of times said first message is received from said first application; and
  comparing said count with said number of occurrences to obtain a logical result,
  wherein said identifying and said configuring are performed on one value of said logical result and not performed upon another value of said logical result.

17. The digital processing system of claim 16, wherein said first condition further specifies a first time instance and a first event, wherein said digital processing system performs said maintaining and said comparing only after said first time instance and the occurrence of said first event.

\* \* \* \* \*